(12) United States Patent
Holland et al.

(10) Patent No.: US 7,315,251 B1
(45) Date of Patent: Jan. 1, 2008

(54) ALERT FOR INDICATING FIELD REPLACEABLE UNIT STATUS AND CONFIGURATION

(75) Inventors: Thomas Holland, Mountain View, CA (US); Peter Snyder, Menlo Park, CA (US); David J. Baik, San Jose, CA (US); Ko Yamamoto, Campbell, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 307 days.

(21) Appl. No.: 11/048,284

(22) Filed: Jan. 31, 2005

(51) Int. Cl.
*G08B 21/00* (2006.01)
(52) U.S. Cl. ...................... 340/635; 340/679
(58) Field of Classification Search .................. None
See application file for complete search history.

(56) References Cited

U.S. PATENT DOCUMENTS

| | | | | |
|---|---|---|---|---|
| 3,272,951 A | * | 9/1966 | O'Brien | 200/314 |
| 3,573,558 A | * | 4/1971 | Babcock | 361/680 |
| 3,681,665 A | * | 8/1972 | Olds et al. | 361/681 |
| 3,764,857 A | * | 10/1973 | Bartlett et al. | 361/681 |
| 5,754,112 A | * | 5/1998 | Novak | 340/635 |
| 5,859,591 A | * | 1/1999 | Marmonier | 340/815.4 |
| 2002/0005786 A1 | * | 1/2002 | Holce et al. | 340/664 |
| 2005/0172936 A1 | * | 8/2005 | Magnoux et al. | 123/498 |

* cited by examiner

*Primary Examiner*—Julie Bichngoc Lieu
(74) *Attorney, Agent, or Firm*—Suiter Swantz pc llo

(57) ABSTRACT

The present invention is a method and system for indicating field replaceable unit status and configuration. A visible alert may be mounted on a card, in proximity to a location for a field replaceable unit. The visible alert may indicate a failed replaceable unit or a location for installation of a new replaceable unit. Supplemental power may be available on the card whereby a visible alert may be operable when an appliance, which contains the field replaceable unit, is powered down or when the card has been removed from the appliance. Additionally, an appliance in accordance with the present invention may include cards with visible alerts associated with field replaceable units. The visible alerts may be visible to an administrator without opening the chassis of the appliance.

9 Claims, 12 Drawing Sheets

ALERT FOR INDICATING FIELD REPLACEABLE UNIT STATUS AND CONFIGURATION

FIELD OF THE INVENTION

The present invention generally relates to the field of field replaceable units, and more particularly to a method and system for indicating status and configuration of field replaceable units.

BACKGROUND OF THE INVENTION

Consumer, computing and networking appliances typically include a plurality of field replaceable units, whereby each of the field replaceable units provides a particular function. A field replaceable unit may refer to a removable unit, removability being effected by a pluggable connector, mechanical fasteners and the like. Field replaceable units may include any component, assembly, or module. An example of an appliance with field replaceable units may be a personal computer. A personal computer may include several field replaceable units, such as a motherboard, network card, cooling fan and the like. A network card, one type of field replaceable unit, may require replacement after the network card has failed, requiring the installation of a new network card in the proper location in order for the network card to provide its functionality within the personal computer.

As appliances have become more advanced, the number of field replaceable units contained within appliances has proportionately increased. Additionally, field replaceable units and other components contained within an appliance have a reduced form factor. Consequently, the difficulty associated with detecting a malfunctioning replaceable unit, removing a failed field replaceable unit, and installing a new field replaceable unit has substantially increased. Thus, a method and system for indicating status and configuration of field replaceable units is necessary.

SUMMARY OF THE INVENTION

Accordingly, the present invention is directed to a method and system for indicating a field replaceable unit status and configuration. In one embodiment of the invention, a visible alert may be mounted on a card, in proximity to a receptacle for securing a field replaceable unit. The visible alert may be software enabled, whereby the visible alert may indicate a failed field replaceable unit. The visible alert may be coupled to a supplemental power source, such as a battery or capacitor, whereby a visible alert may be operable when an appliance, which contains the field replaceable unit, is powered down and when the card which includes the receptacle for the field replaceable unit is detached from the appliance.

In a second aspect of the present invention, the components of an appliance may be arranged in a fashion whereby visible alerts associated with field replaceable units in accordance with the present invention and placed within an appliance may be visible to an administrator without opening the chassis of the appliance. For example, a transparent section or a plurality of apertures may be integrated within the chassis to allow visibility of the visible alert of the field replaceable unit without opening the chassis of the appliance. The visible alert may indicate that the appliance may require attention, and, after the appliance is opened, may direct an administrator to the particular field replaceable unit that may require attention. In an alternative embodiment of the invention, a front panel visible alert may be mounted to the front panel of the appliance. The front panel visible alert may indicate a status condition concerning a field replaceable unit. When the chassis of the appliance is opened, the visible alert may indicate a status condition regarding the associated field replaceable unit.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
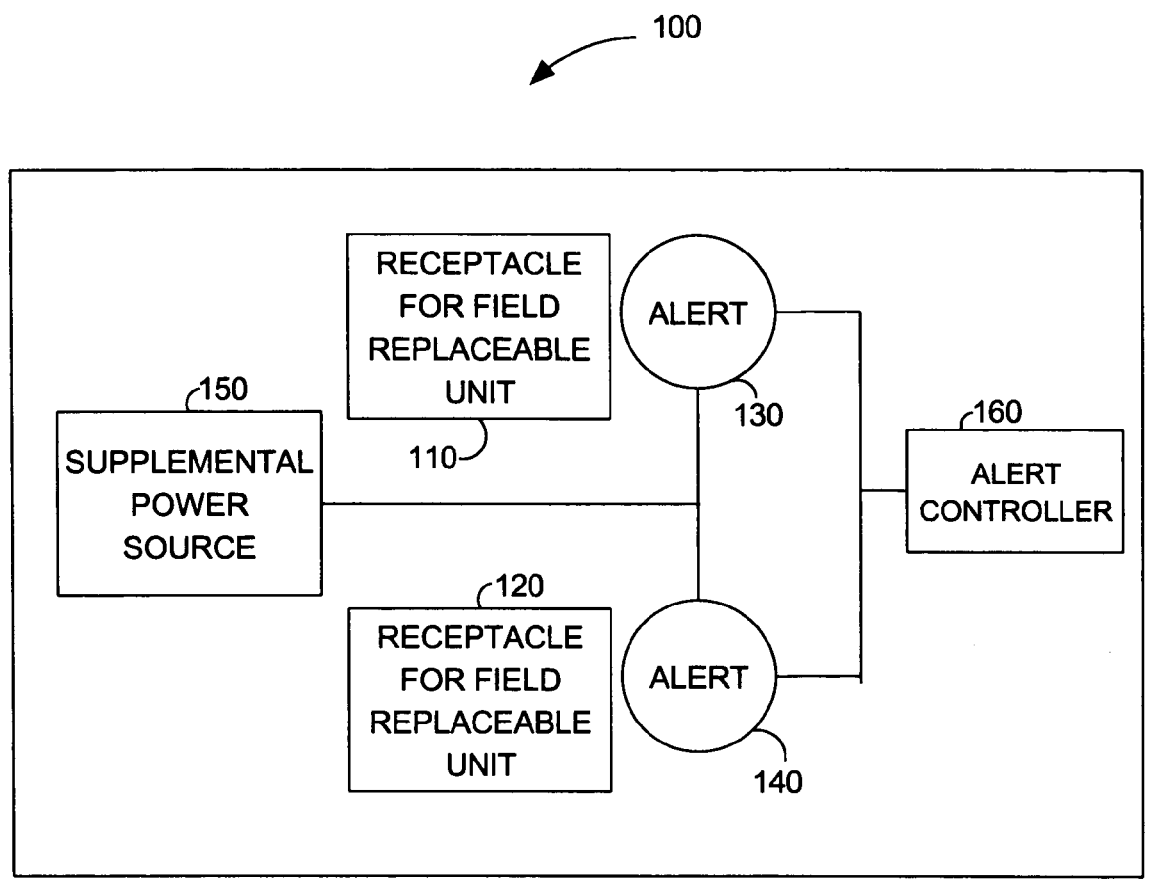
FIG. 1 depicts a card including a field replaceable unit status and configuration indication in accordance with an embodiment of the present invention.

Referring to FIG. 1, a card 100 including field replaceable unit status and configuration indication in accordance in accordance with an embodiment of the present invention is shown. It is contemplated that card 100 may include any apparatus, including a housing, board, frame and the like that may house at least one field replaceable unit via at least one receptacle. In one embodiment of the invention, card 100 may be installed within an appliance. Additionally, card 100 may be a field replaceable unit itself, whereby field replaceable units may be housed to a field replaceable unit. Card 100 may be capable of receiving power for field replaceable units installed on the card 100, and may also transfer data to and from an appliance. In one embodiment of the invention, card 100 may be a motherboard for an appliance, such as a computing appliance.

Card 100 may include receptacles for field replaceable units 110, 120, alerts 130, 140, a supplemental power source 150 and an alert controller 160. Various testing, diagnostic and maintenance procedures may be executed whereby alerts 130, 140 may indicate a particular status regarding a field replaceable unit or a location for installation of a field replaceable unit. Testing, diagnostic and maintenance procedures, hereinafter described collectively as detection procedures, are described with respect to FIG. 4, status levels being described in FIG. 5.

In an advantageous aspect of the present invention, removal of failed field replaceable units and installation of new field replaceable units may be effected when power is shut-down to an appliance in which the card 100 is contained. Card 100 may include a supplemental power source 150 whereby power is supplied to the alerts 130, 140. Supplemental power source may provide power to visible alerts 130, 140 when the card 100 has been removed from the appliance, or when the appliance is powered down. This may allow removal of the card 100 from the appliance when card 100 itself is a field replaceable unit, whereby alerts 130, 140 may still be enabled (for example, lit) or aiding an administrator regarding failed field replaceable units installed within receptacles 110, 120 and proper locations for installation of new field replaceable units. Supplemental power source 150 may refer to a battery, such as a rechargeable battery. Rechargeable battery may be recharged, as necessary, when card 100 is receiving power from an appliance. In alternative embodiments of the invention, supplemental power source 150 may refer to a capacitor or fuel cell, each providing power to the alerts 130, 140 when power is unavailable from an appliance.

Alerts 130, 140 may refer to visible alerts, recognizable by an administrator when enabled. In one embodiment of the invention, alerts 130, 140 may be light emitting diodes. Light emitting diodes may provide a small form factor, minimal power consumption, and ease in mounting the light emitting diode in close proximity to a particular field replaceable unit. While light emitting diodes are an example of one type of alert, it is contemplated that other types of visible alerts may be utilized in accordance with the present invention without departing from the scope and intent of the present invention.

Figure 4:
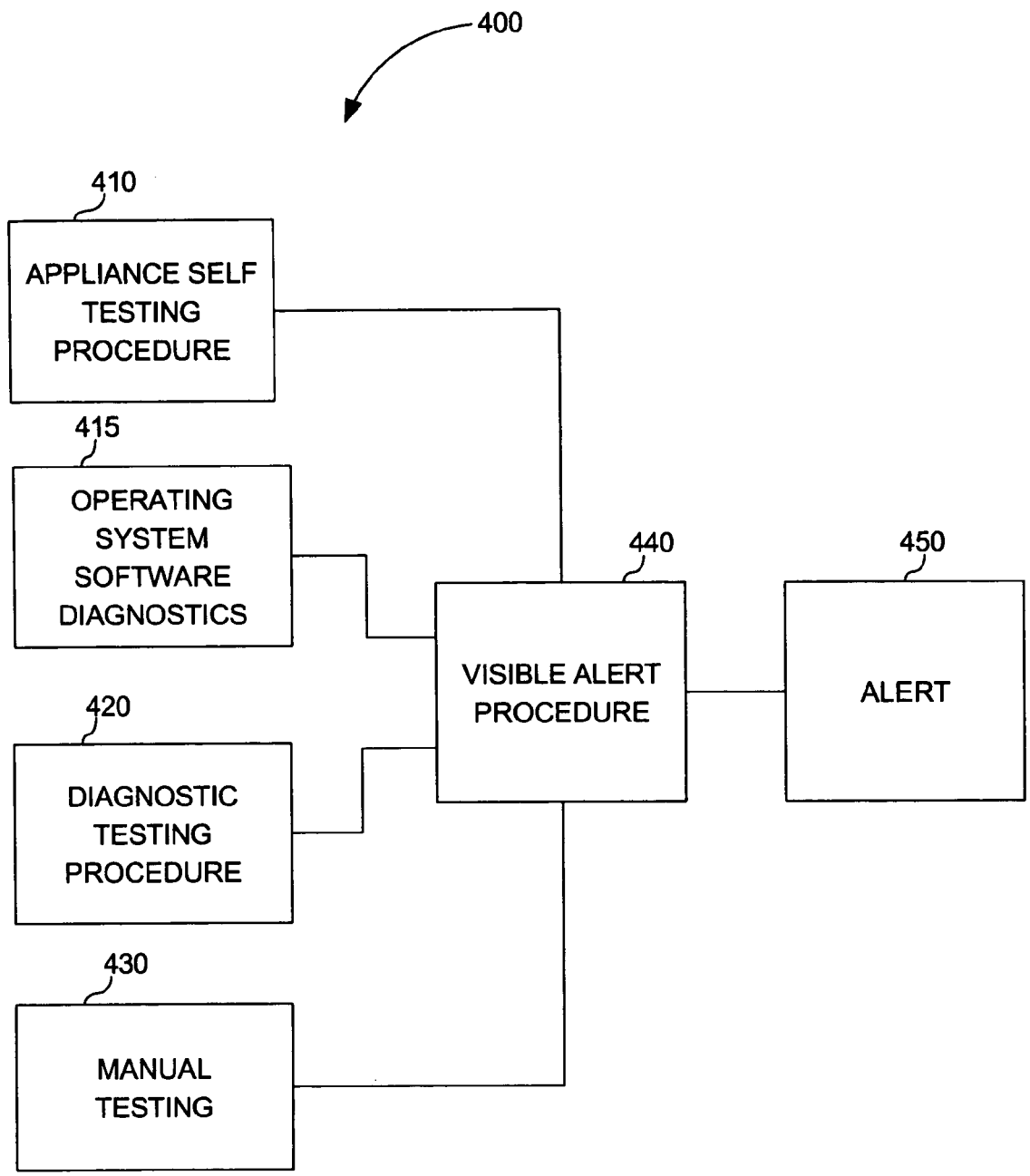
FIG. 4 depicts multiple types of detection procedures that may operate in conjunction with field replaceable unit status and configuration in accordance with the present invention.

Alert controller 160 may include circuitry, hardware and the like, which may interface with a visible alert procedure 440 of FIG. 4. Alert controller 160 may receive a signal in which a particular field replaceable unit should be removed, or alternatively, a particular receptacle is the proper location for the installation of a new field replaceable unit. Alert controller 160 may process the signal, identify the associated alert 130, 140 which should be enabled, and enable the particular alert 130, 140 associated with the particular field replaceable unit or receptacle.

Alert controller 160 may be advantageous when card 100 is implemented as a field replaceable unit. Testing may be performed to ensure field replaceable units, installed within receptacles 110, 120 are operable. Detection of a status level of field replaceable units installed within receptacles 110, 120 may be accomplished when card 100 is coupled to an appliance. For example, the alert controller 160 may receive a signal that a particular field replaceable unit has failed. Alert controller 160 may process the signal, and enable a particular alert 130, 140 when the card 100 is coupled to an appliance. Additionally alert controller 160 may be operable for enabling an alert 130, 140 after it has received a signal from the appliance and card 100 has been disconnected from an appliance.

In an alternative embodiment of the invention, alert controller 160 may not be present on a card 100. In applications where card 100 may be more permanently secured within an appliance, the functionality of the alert controller may be implemented within various hardware/software schemes, for example through visible alert procedure 440 of FIG. 4. For example, detection of a failed field replaceable unit, and instruction to indicate a failed status level by an alert may be executed by processing capability in which card 100 is contained. It is contemplated that the term permanently secured may refer to a card which is not easily removable from the appliance and thus would not be considered a field replaceable unit itself. The presence of an alert controller 160 on card 100, as previously described, may provide a functional advantage when the card 100 has been disconnected from an appliance.

Figure 2A:
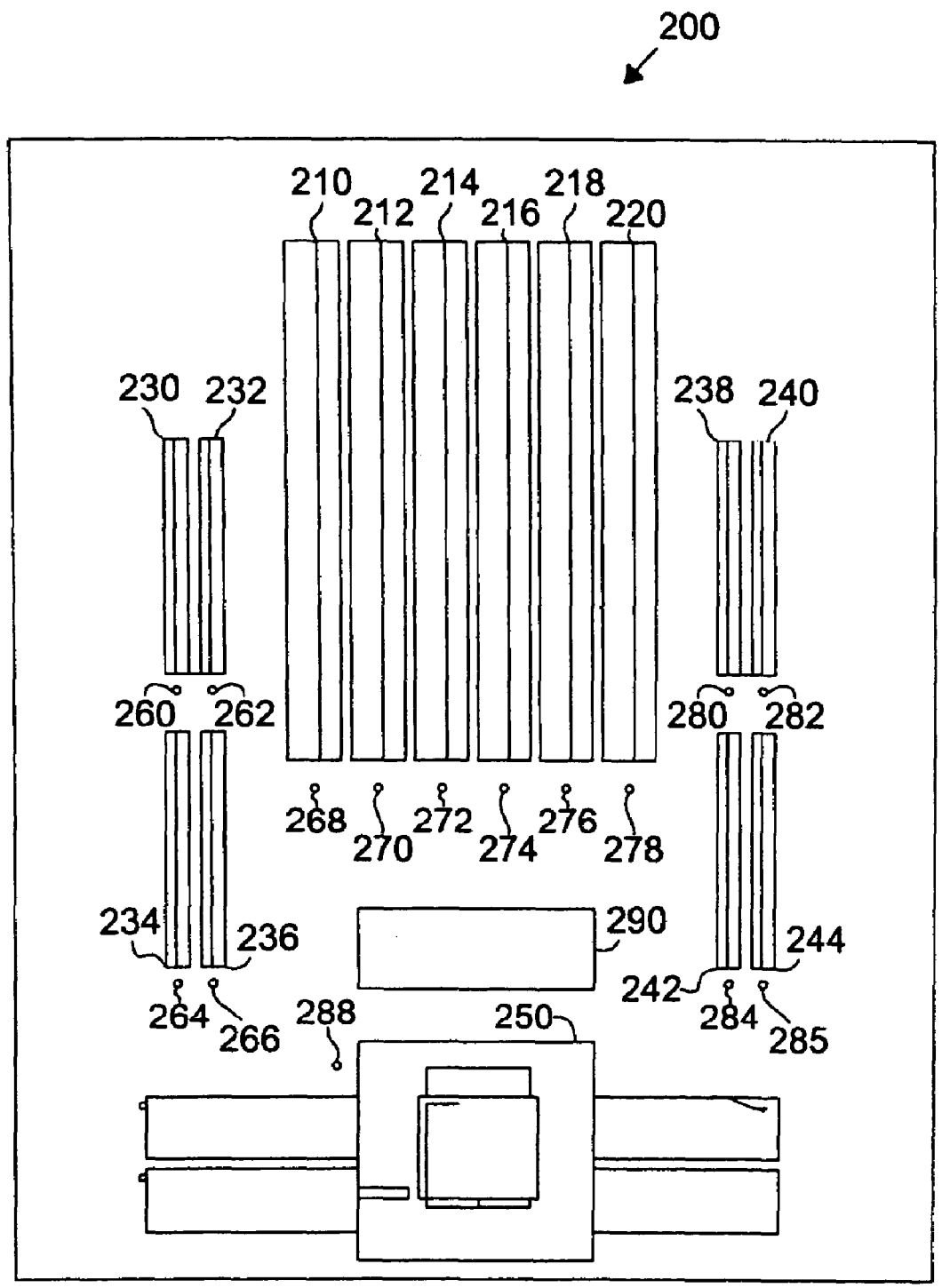
FIGS. 2A and 2B depict a top view and perspective view of a card configuration in accordance with the present invention.
Figure 2B:
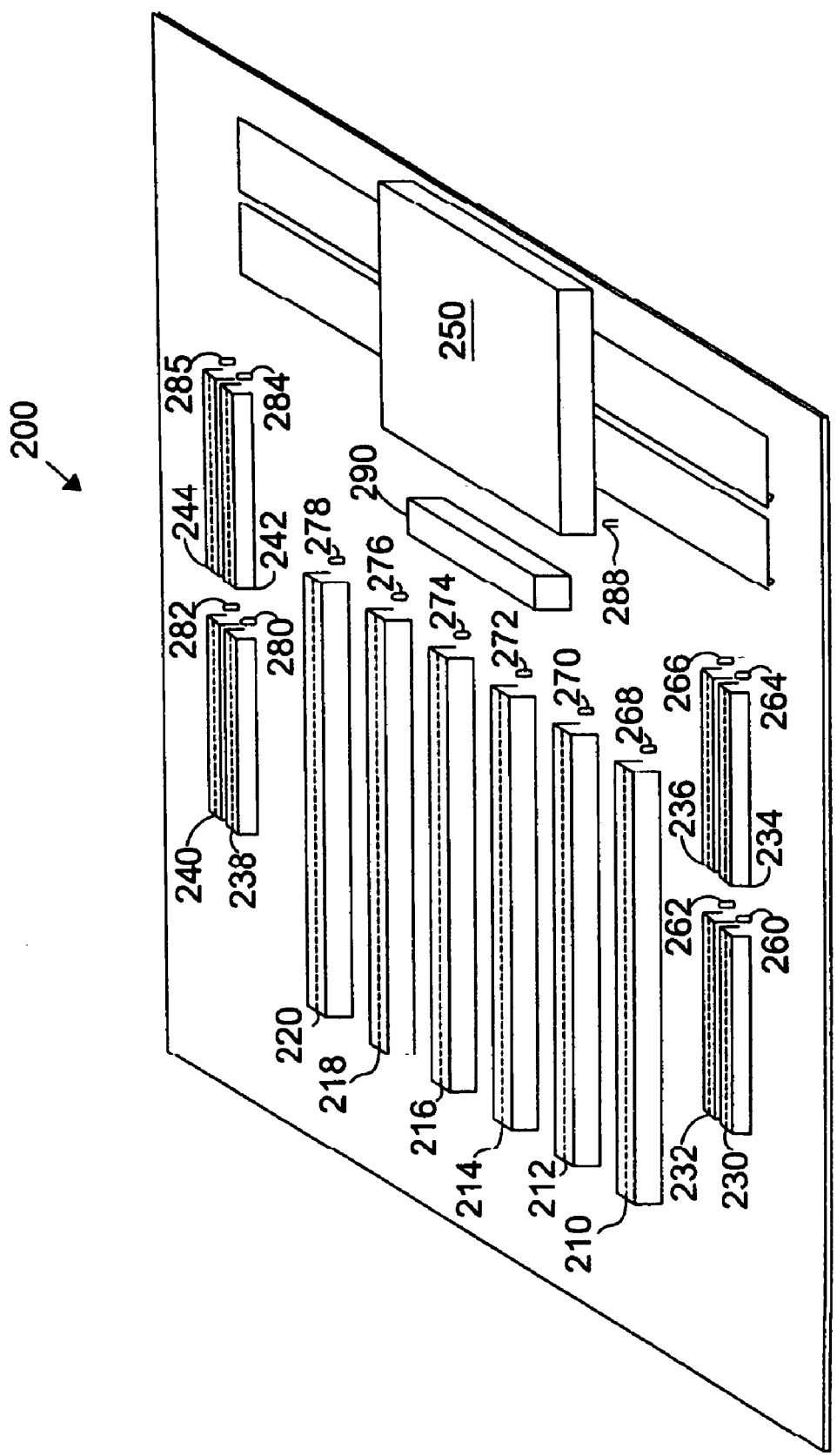

Referring to FIGS. 2A and 2B, a top view and perspective view of a card configuration 200 in accordance with the present invention is shown. Card configuration 200 may be representative of a motherboard, the motherboard containing peripheral component interconnect (PCI) sockets 210-220, dual inline memory module (DIMM) sockets 230-244, and a fan can 250. Visible alerts 260-288 may be placed in proximity with the PCI sockets 210-220, DIMM sockets 230-244 and fan can 250. A single visible alert 260-288 may be placed in proximity with a receptacle that may secure a field replaceable unit. As used herein, receptacle may refer to any housing, port, socket and the like which may secure a field replaceable unit. In an embodiment of the invention, a visible alert may be mounted directly to a receptacle whereby the visible alert is visible to an administrator when a field replaceable unit is installed and when a field replaceable unit is not installed within the receptacle. Card configuration 200 may also include supplemental power source 290, the supplemental power source 290 providing supplemental power to visible alerts 260-288 when the card 200 is not receiving power from an outside source, such as an appliance.

During detection procedures (described in FIG. 4), it may be revealed that a field replaceable unit has failed. For instance, a DIMM located in DIMM socket 230 may have failed. Upon a detection of the failure, the associated visible alert 260 may be identified and enabled to indicate the failed status level of the DIMM.

Figure 3:
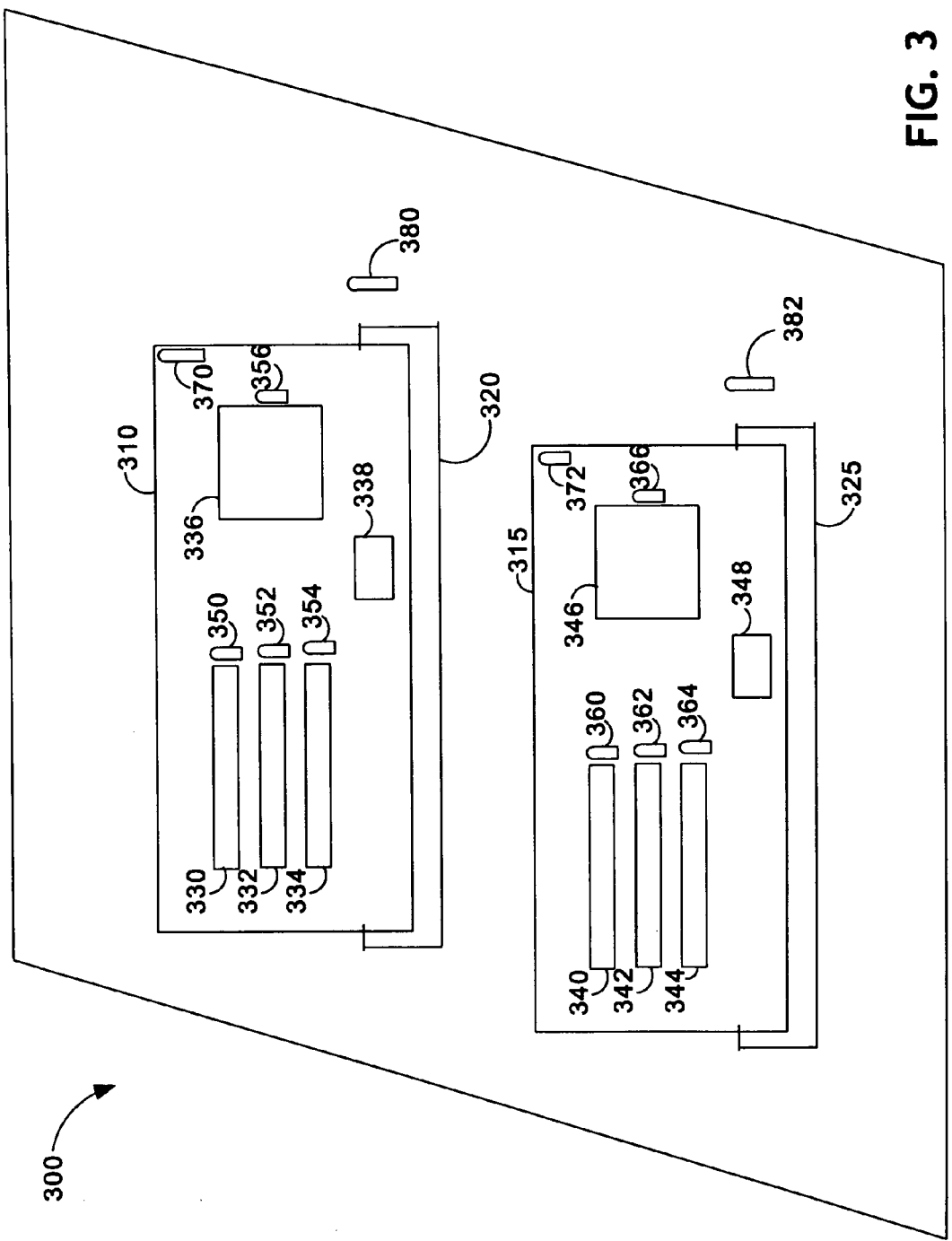
FIG. 3 depicts a field replaceable unit installed on a field replaceable unit for indicating status and configuration in accordance with an embodiment of the present invention.

Referring to FIG. 3, a field replaceable unit installed on a field replaceable unit for indicating status and configuration 300 in accordance with an embodiment of the present invention is shown. For instance, card 310 may include (DIMM) sockets 330-334, a fan can 336 and supplemental power source 338. Visible alerts 350-356 may be placed in proximity with the DIMM sockets 330-334 and fan can 336. A visible alert 370 may provide a further alert regarding card 310 and may be visible to a user when installed within an appliance. Visible alert 370 may be enabled when one of visible alerts 350-356 are enabled to aid in the alerting process. Visible alert 370 may be positioned within card 315 to allow easier detection. Card 315 may include (DIMM) sockets 340-344, a fan can 346. Visible alerts 360-366 may be placed in proximity with the DIMM sockets 340-344 and fan can 346. A visible alert 372, similar to visible alert 370, may provide a further alert regarding card 315 and may be visible to a user when installed within an appliance.

Cards 310, 315, including multiple field replaceable units, may be field replaceable units themselves. Card 310 may be secured within receptacle 320, card 315 being secured within receptacle 325. A visible alert 380, 382 may be placed in proximity with each receptacle 320, 325. Thus visible alert 380, 382 may indicate status information for card 310, 315. This information may be that card 310, 315 has failed and may also indicate that a field replaceable unit within card 310, 315 has failed. For example, DIMM 330 may have failed. Visible alert 350 may be enabled, along with visible alerts 370 and 380. When card 310 is removed from the appliance, visible alerts 350, 370 and 380 may remain enabled. Visible alerts 350 and 370 may receive power from supplemental power source 338. This may be beneficial as the particular field replaceable unit that has failed, the DIMM 330 in this example, may be indicated by the visible alert 350 and 370 even after the card 310 has been removed from an appliance. As the DIMM is replaced, the visible alert 350 may remain enabled to alert the proper location for replacement.

Referring to FIG. 4, multiple types of detection procedures 400 that may operate in conjunction with field replaceable unit status and configuration in accordance with the present invention are shown. As used herein, detection procedures may include appliance startup tests, including start up procedures, diagnostic tests, performance tests and new installation tests, along with regular operation of an operating system and its ability to detect failures in field replaceable units. Detection procedures 410-430 may operate in conjunction with a visible alert procedure 440, the visible alert procedure 440 receiving signals regarding a status of a field replaceable unit, and processing those signals to direct a particular alert 450 regarding the status of the field replaceable unit.

Visible alert procedure 440 may refer to a program of instructions, implemented in software or hardware, which operates with conventional testing, diagnostic, maintenance and operating procedures. It is contemplated that visible alert procedure 440 may include functionality provided by alert controller including receiving of a signal regarding a particular receptacle for installation or status regarding a field replaceable unit, identify the associated visible alert, and enable the visible alert to indicate the current status level. In embodiments of the invention, visible alert procedure 440 may communicate with card 100 (FIG. 1) via an existing communicative mechanism, such as a network interface and/or bus interface. When alert controller 160 is present on card 100, visible alert procedure 440 may communicate with alert controller 160 via an existing communicative mechanism that card 100 has with an appliance. In an embodiment of the invention where an alert controller 160 is not present on the card, alert procedure 440 may communicate with visible alerts 130, 140 via the communicative mechanism that card 100 has with an appliance.

The first type of detection procedure may be an appliance self testing procedure 410. For instance, the self-testing procedures may be part of a power on self testing (POST) procedure, known to the art. Additionally, appliance self testing procedure may include basic input/output instructions (BIOS). The procedures may be executed automatically by the appliance when an appliance is powered as part of a start up process. In an embodiment of the invention, visible alert procedure 440 may be added to a BIOS or POST procedure. When a BIOS or POST procedure is executed, field replaceable unit status may be determined. Visible alert procedure 440 may automatically receive data concerning field replaceable unit status, process the data, and direct a particular alert 450 regarding a status of a field replaceable unit.

Operating system software diagnostics 415 may be another type of detection procedure. For instance, an appliance may be operating according to an operating system, such as Data ONTAP™ software written by Network Appliance of Sunnyvale, Calif. Operating system software includes modules for detecting failures and other status conditions in field replaceable units. Consequently, operating system software may be capable of detecting a status condition of a field replaceable unit during operation of the operating system software executed by an appliance. Advantageously, status conditions of field replaceable units may be determined in the absence of a particular test or series of tests. Visible alert procedure 440 may automatically receive data from an operating system software 415 concerning field replaceable unit status, process the data, and direct a particular alert 450 regarding a status of a field replaceable unit.

Another type of detection procedure may refer to diagnostic testing 420. Diagnostic testing 420 may refer to tests performed to determine a source of a problem, enhance performance, and the like, performed on an appliance in which field replaceable units are contained. It is contemplated that various diagnostic testing schemes may be employed by those with ordinary skill in the art, including memory diagnostics, network storage, and other peripheral components connected to a system via a bus technology, such as PCI. Diagnostic testing may operate to determine status levels of field replaceable units. Visible alert procedure 440 may operate in conjunction with diagnostic testing 420 and may process status data concerning field replaceable unit status, process the data, and direct a particular alert 450 regarding a status of a field replaceable unit.

Manual testing 430 may include direct tests to determine the operability of field replaceable units. For instance, the DIMM sockets 230-244 of a card configuration 200 of FIGS. 2A and 2B may be tested. After the test has been performed, status of each DIMM may be provided through a corresponding light emitting diode. Manual testing 400 may also operate to determine a proper location of a new installation, whereby a light emitting diode corresponding to a proper receptacle is lit to aid an administrator in the installation of a new field replaceable unit. Visible alert procedure 440 may operate in conjunction with manual testing 430 and may process status data concerning field replaceable unit status, process the data, and direct a particular alert 450 regarding a status of a field replaceable unit.

In an embodiment of the invention, detection procedures 400 may operate to determine a particular field replaceable unit in receptacle 110, 120 (FIG. 1) has failed, and replacement of the field replaceable unit is required. Alert controller 160 may operate with the visible alert procedure 440 to enable a corresponding alert 130,140, thus the corresponding alert 130, 140 may indicate the failure of the field replaceable unit. In an embodiment where card 100 of FIG. 1 does not include an alert controller 160, visible alert procedure 440 may operate independently to enable a corresponding alert 130,140 regarding the failure of the field replaceable unit.

Figure 5:
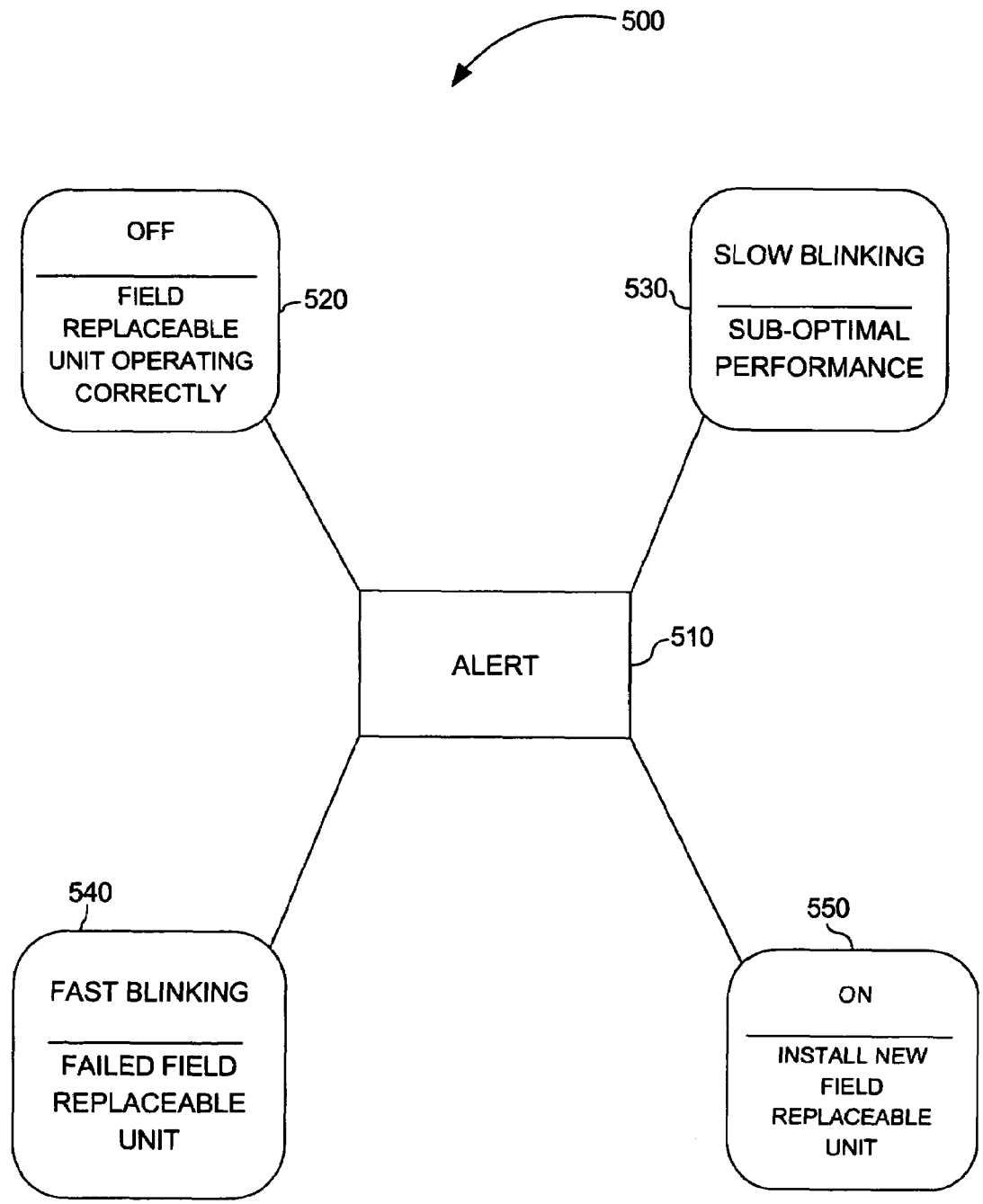
FIG. 5 depicts multiple operating states of an alert representing multiple status levels in accordance with an embodiment of the present invention.

Referring to FIG. 5, multiple operating states 500 of an alert representing multiple status levels in accordance with an embodiment of the present invention are shown. In an advantageous aspect of the present invention, alert 510 may be capable of multiple operating states 500 whereby indication of various status levels may be provided. For example, if the alert is off 520, e.g., a visible alert is not lit, this may indicate a field replaceable unit is operating correctly and optimally. Additionally, an alert that is off, corresponding to a receptacle that is not securing a field replaceable unit, may represent that its receptacle is not a proper location for installation of a new field replaceable unit.

When an alert may be blinking slowly 530, this may indicate to an administrator sub-optimal performance of the field replaceable unit. Sub-optimal performance may be a status level whereby the field replaceable unit is operable, however, is operating at a capacity level less than full capacity. Fast blinking of the alert 540 may indicate a failed field replaceable unit. This indication may remain on until the failed field replaceable unit has been removed and a new field replaceable unit has been installed. When the alert is continuously on, for example, the alert is continuously lit, this may indicate a new installation of a field replaceable unit.

Implementation of multiple operating states may be effected by visible alert procedure 440 of FIG. 4. A program of instructions, and/or hardware may be employed to control the alert, including an off state, on state, slow blinking state, and fast blinking state. Various methods of controlling an operating state of a visible alert are known to those with ordinary skill in the art which would not depart from the scope and intent of the present invention.

It is contemplated that a different arrangement of operating states and status levels may be utilized by those with skill in the art which would not depart from the scope and intent of the present invention. Further other mechanisms, such as color, may be employed to indicate multiple operating systems. It is further contemplated that two operating states, for example an alert that is on and off, would not depart from the scope and intent of the present invention.

Figure 6:
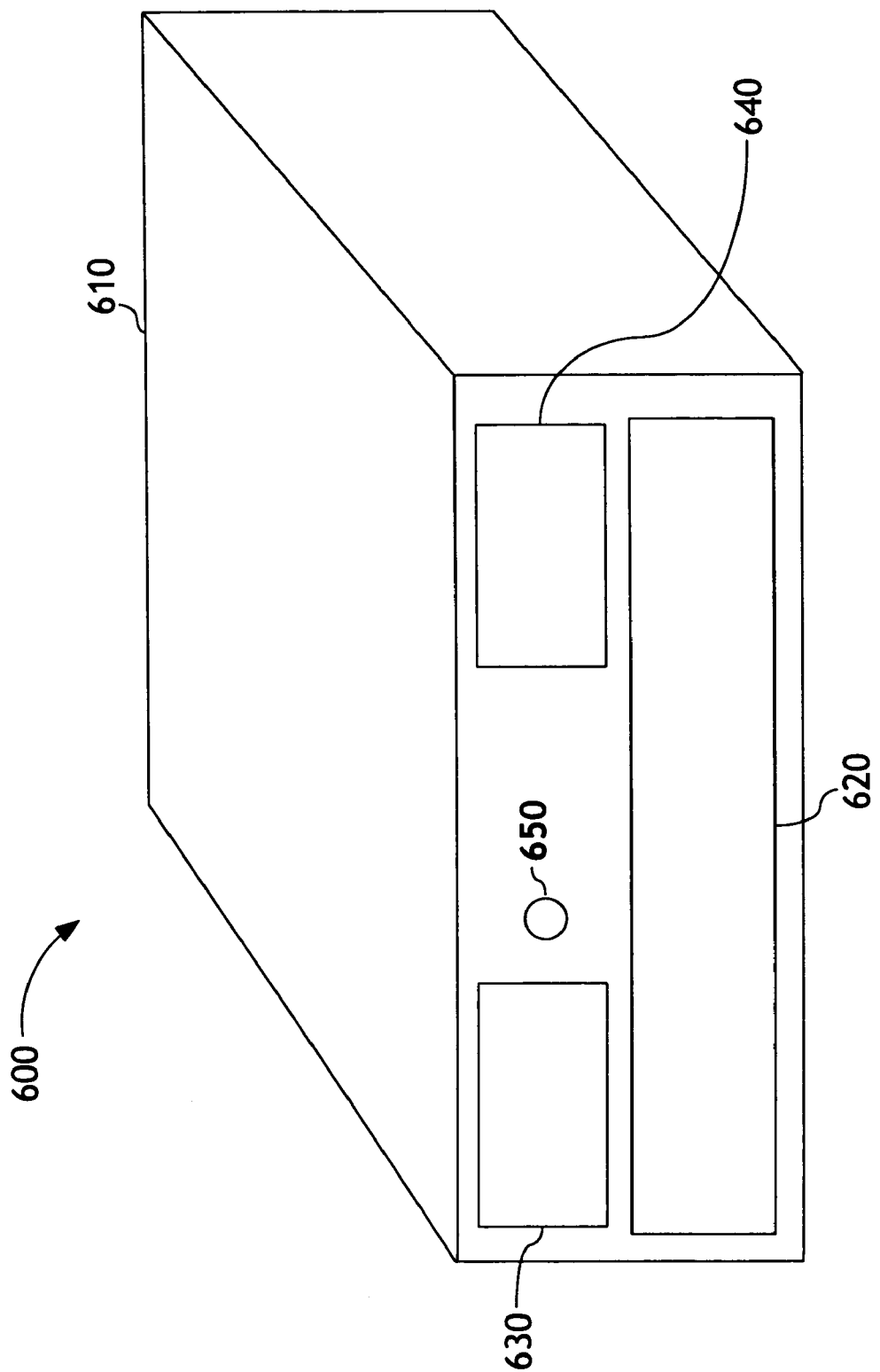
FIG. 6 depicts an appliance in accordance with an embodiment of the present invention.

Referring to FIG. 6, an appliance 600 in accordance with an embodiment of the present invention is shown. Appliance 600 may be in the form of a storage controller, personal computer and the like in which card 100 is employed. Appliance 600 in accordance with the present invention may include one or more cards 100 as shown in FIG. 1.

Appliance 600 may include a chassis 610 and a contents viewing port 620, and various interfaces 630-640 to enable the desired features of the appliance 600. It is contemplated that appliance 600 may include, for example, card 100, a processor, network interfaces, a hard drive, internal bus and the like (not shown). In an advantageous aspect of the present invention, contents of the appliance 600 may be arranged within the chassis 610 such that an alert 130, 140 of the card 100, in the form of a visible alert, may be visible by an administrator through the contents viewing port 620 of the appliance 600. For example, card configuration 200, implemented as a motherboard, may be installed within appliance 600 whereby the visible alerts 260-286 may be visible to an administrator through the contents viewing port 620.

It is contemplated that contents viewing port 620 may be a transparent cover which allows a user to view the contents of the appliance 600. In an alternative embodiment of the present invention, contents viewing port 620 may include apertures whereby an administrator may view the contents of the appliance. In an advantageous aspect of the present invention, apertures may improve ventilation of the appliance 600 to disperse heat produced by a processor and other components of the appliance 600. In such an implementation, the visible alert may indicate that the appliance 600 may require attention, and, after the appliance is opened, may direct an administrator to the particular replacement unit that may require attention. It is further contemplated that other types of contents viewing port 620 may be employed by those with ordinary skill in the art to allow viewing access to an alert of a removable memory media of the present invention without departing from the scope and intent of the present invention.

As an alternative embodiment, appliance 600 may include light paths for visible alerts to the external side of a chassis 610 of the appliance 600. For example, light paths may be established by conventional means such as fiber optics which may be utilized to direct light from a visible alert to a front panel display of appliance 600. In such an implementation, the visible alert may indicate that the appliance 600 may require attention, and, after the appliance is opened, may direct an administrator to the particular replacement unit that may require attention.

In yet another alternative embodiment of the present invention, a front panel visible alert may be integrated in a front panel display of the appliance 600. When a field replaceable unit has a status level, its associated visible alert may be enabled. When the visible alert associated with the field replaceable unit has been enabled, the front panel visible alert may also be enabled. Advantageously, the front panel visible alert may indicate that the appliance 600 may require attention, and, after the appliance is opened, the visible alert associated with a field replaceable unit may direct an administrator to the particular replacement unit that may require attention.

Figure 7A:
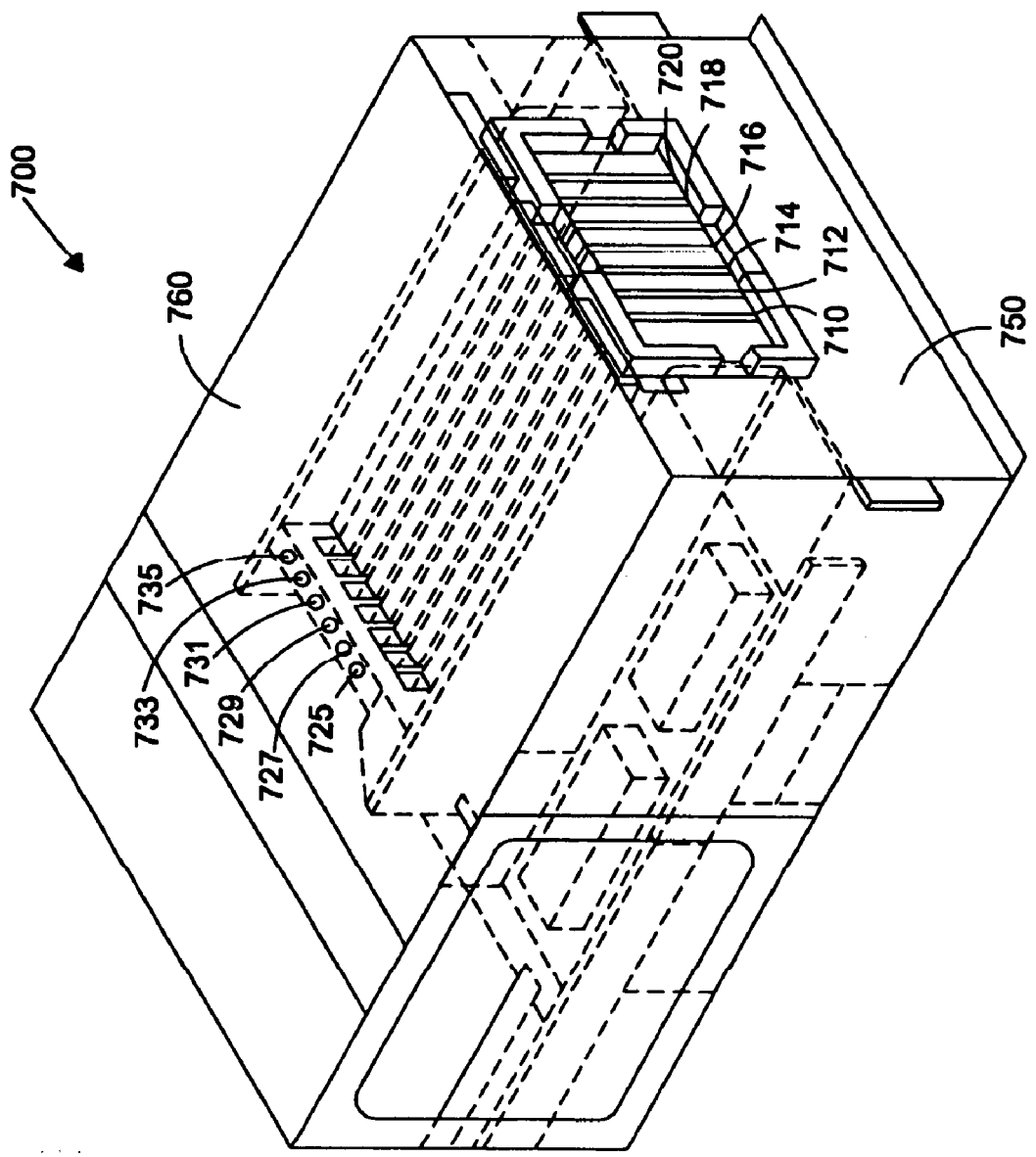
FIGS. 7A and 7B depict an alternative embodiment of an appliance 700 in accordance with the present invention.
Figure 7B:
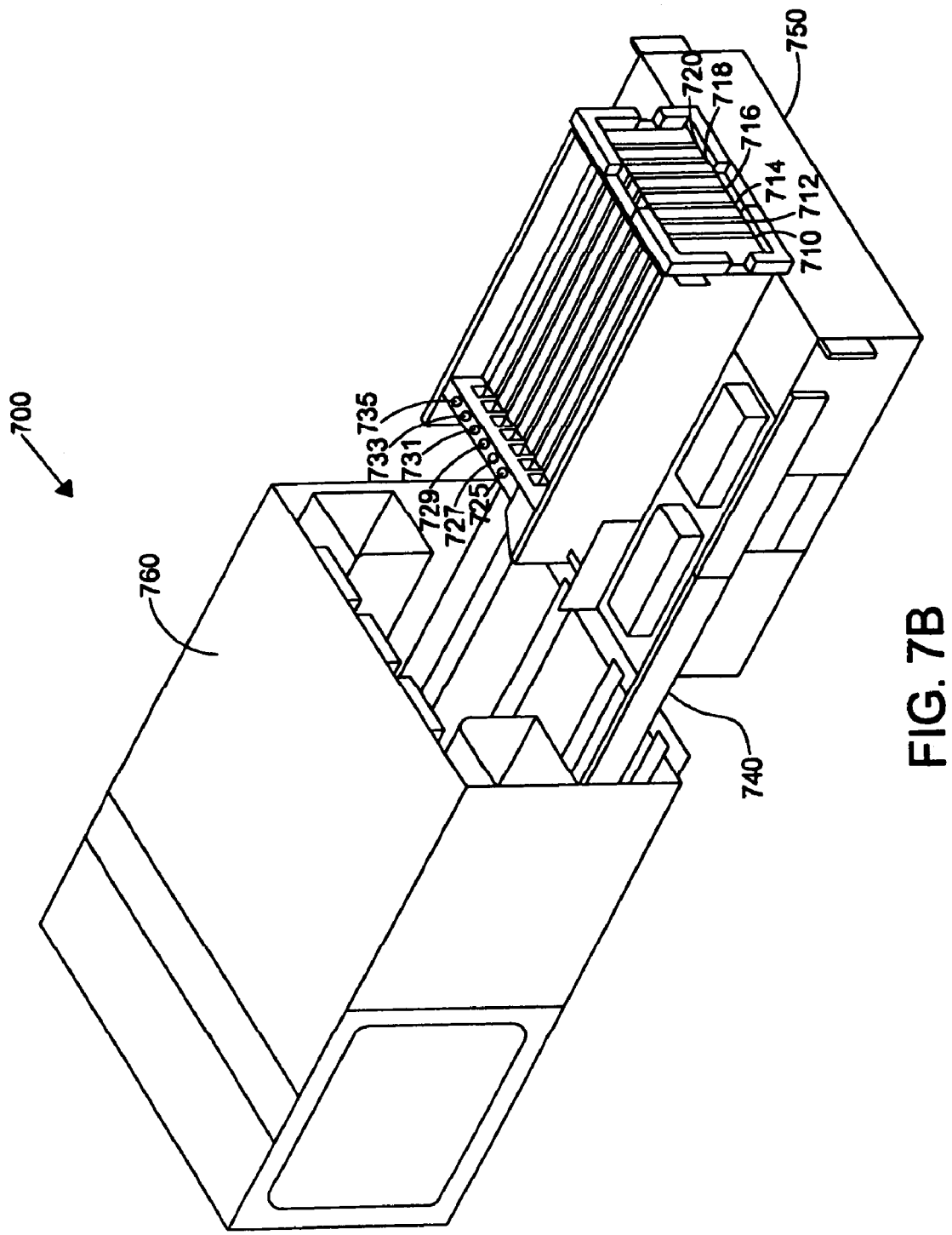

Referring now to FIGS. 7A and 7B, an alternative embodiment of an appliance 700 in accordance with the present invention is shown. FIG. 7A depicts an appliance 700 with a removable drawer housed within the appliance, FIG. 7B depicts an appliance 700 with the removable drawer located outside of the appliance. It is contemplated appliance 700 may be employed to house card 200 of FIGS. 2A and 2B.

Appliance 700 may include a plurality of PCI slots, 710-720. Visible alerts 725-735 may be placed in proximity with the PCI slots 710-720. Tray 740 may secured to the chassis of appliance 700 and further mounted with drawer 750. Drawer 750 housing a plurality of field replaceable units. In an embodiment of the invention, a top side 760 of the appliance may be transparent, thus visible alerts 725-735 may be visible to a system administrator when the drawer is within the appliance. In such an implementation, the visible alerts 725-735 may indicate that appliance 700 may require attention, and, after the appliance is opened, may direct an administrator to the particular replacement unit that may require attention.

Advantageously, as stated a visible alert 725-735 may indicate a status condition regarding a PCI card placed within one of PCI slots 710-720. It is contemplated that drawer 750, and its plurality of field replaceable units may receive power from the appliance 700 when drawer 750 is located within appliance 700. When drawer 750 is located outside of appliance 750, power may be unavailable from the appliance 700. In an advantageous aspect of the present invention, drawer 750 may include a supplemental power source, such as supplemental power source 150 of FIG. 1. Supplemental power source may provide power to visible alerts 725-735 to provide an indication to an administrator regarding a particular field replaceable unit when the drawer is not receiving power from an appliance and when the drawer 750 is detached from the appliance.

Figure 8:
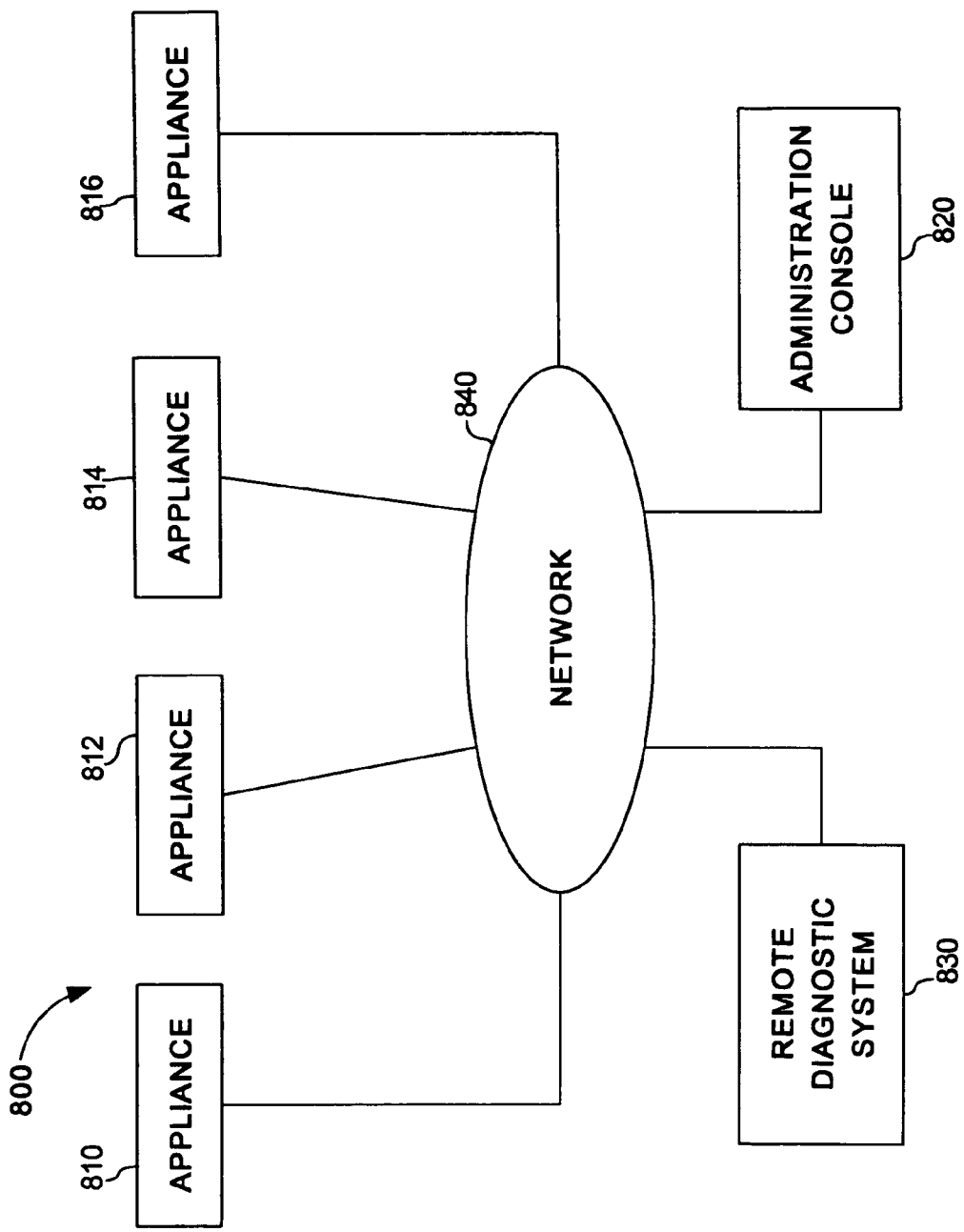
FIG. 8 depicts a network system employing field replaceable unit status and configuration indication in accordance with the present invention.

Referring now to FIG. 8, a network system 800 employing field replaceable unit status and configuration indication in accordance with the present invention is shown. It is contemplated that network system 800 may include a plurality of appliances 810-816, an administration console 820, a remote diagnostic system 830 and a network 840. In an embodiment of the invention, a system administrator (a person) may manage a group of appliances, including computers, servers, and the like from an administration console 820, the administration console including a computing system for managing a plurality of appliances 810-816.

When a failure of a field replaceable unit has been detected, from a type of detection procedures shown in FIG. 4, for example, a message may be sent to the administration console 820 from an appliance 810-816 in which the field replaceable unit is installed. This message may inform the system administrator regarding the failure of the field replaceable unit. A visible alert 130, 140 of FIG. 1 may be engaged automatically in order to indicate the failed field replaceable unit. Alternatively, the visible alert may be engaged by the system administrator, for instance, through appliance array controller software graphical user interface. In such a case, a message may be sent from the administration console 820 to the appliance 810-816, whereby an alert controller 160 of FIG. 1 receives the message and engages the appropriate alert.

Advantageously, the network system 800 may provide enhanced testing of field replaceable units. Testing may be performed under the control of the appliance 810-816, the administration console 820, or the remote diagnostics system 830. A message, regarding a failed field replaceable unit, may be appropriately created and sent, depending upon whether the appliance 810-816, administration console 820, or the remote diagnostics system 830 is conducting the testing. It is contemplated that in exemplary implementations, the administration console 820 may control, automatically or through the system administrator, engagement of a visible alert regarding a failed field replaceable unit.

It is further contemplated that network 840 may refer to a local area network (LAN) or worldwide network, or both a local area network and a worldwide network. For instance, administration console may be located in a same physical location as appliances 810-816 and may be coupled to the appliances 810-816 via a local area network. Remote diagnostics system 830 may be located in a remote physical location to the appliances 810-816 and the administration console 820. Thus, remote diagnostics system 830 may be coupled to administration console 820 and appliances 810-816 via a worldwide network. An example of a worldwide network may be the Internet.

Figure 9:
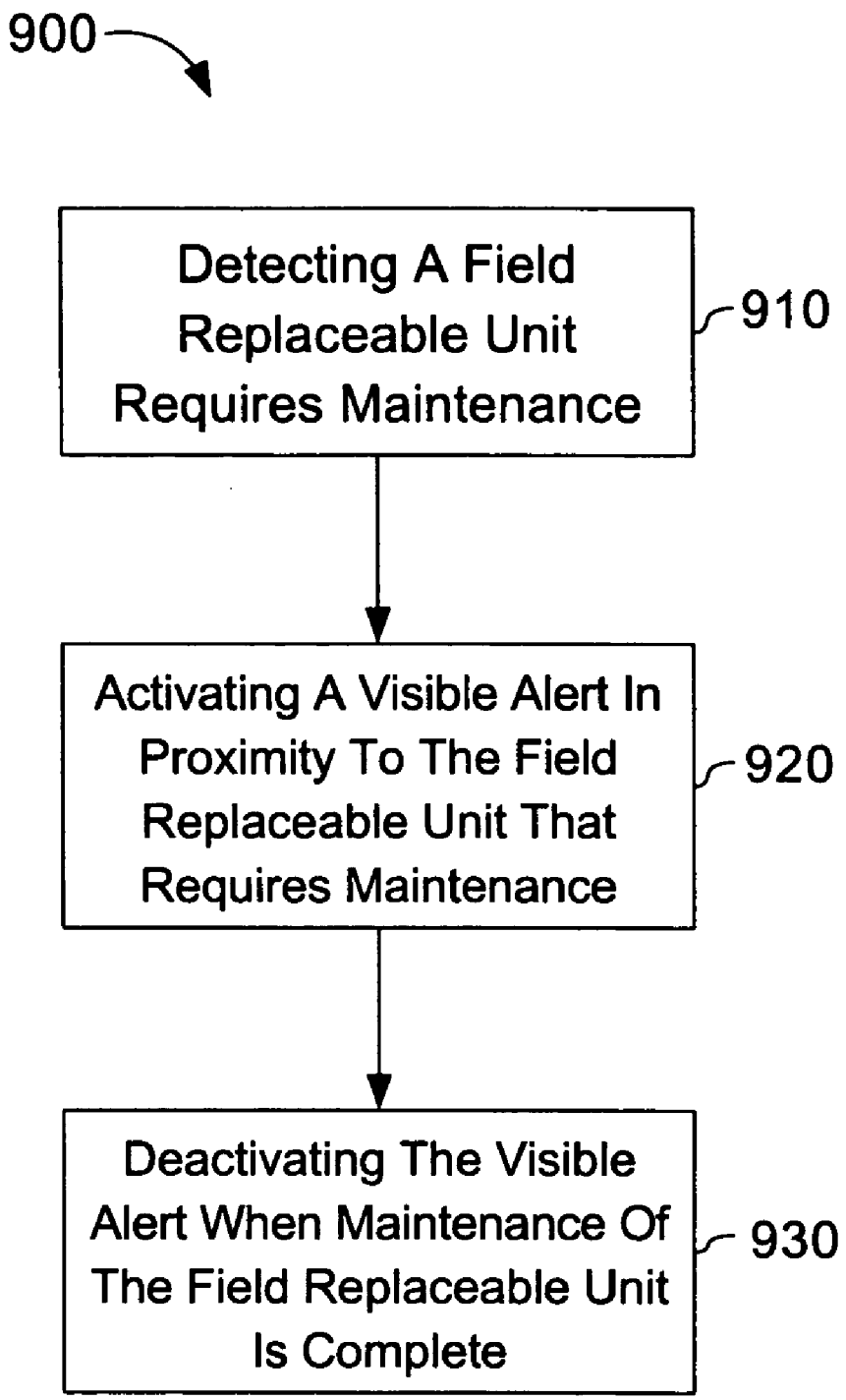
FIG. 9 depicts a method for maintaining an appliance in accordance with an embodiment of the present invention.

Referring to FIG. 9, a method 900 for maintaining an appliance in accordance with an embodiment of the present invention is shown. Method 900 may begin upon detecting a field replaceable unit within an appliance requires maintenance 910. For instance, a field replaceable unit may have failed and installation of a new field replaceable unit is necessary. Alternatively, maintenance may refer to repair or adjustment of a field replaceable unit.

Detecting a field replaceable unit requires maintenance may be determined by performing diagnostic testing on the field replaceable unit. For instance, diagnostic testing may be automatically performed upon a start up process of the appliance. Additionally, diagnostic testing may be performed by operating system software of the appliance as described in FIG. 4. Diagnostic testing may also be performed by a system located in a remote physical location to a location of an appliance.

The next step of method 900 may be activating a visible alert in proximity to the field replaceable unit that requires maintenance 920. In one embodiment of the invention, the visible alert may be automatically activated upon detection of the field replaceable unit requiring maintenance by the appliance. Alternatively, upon detection of a field replaceable unit requiring maintenance, a message may be sent from the appliance housing the field replaceable unit requiring maintenance to a administration console (820 FIG. 8) operatively coupled to the appliance. At that point, a user may activate the appropriate visible alert through the graphical user interface of the administration console. This may be accomplished by sending a message from the administration console to the appliance to activate the appropriate visible alert. For example, a message may be sent to an alert controller (160 of FIG. 1). The visible alert, present upon a card, may remain enabled while work is being performed, even though the card has been detached from an appliance.

When maintenance on the field replaceable unit has been completed, method 900 may deactivate the visible alert 930. Deactivation of the alert may be effected through detection of an insertion of a new field replaceable unit. Detection of the new field replaceable unit may be through plug and play technology, and the like. Alternatively, the visible alert may be deactivated through a message sent from an administration console to the appliance. For example, a message may be sent to an alert controller (160 of FIG. 1).

Figure 10:
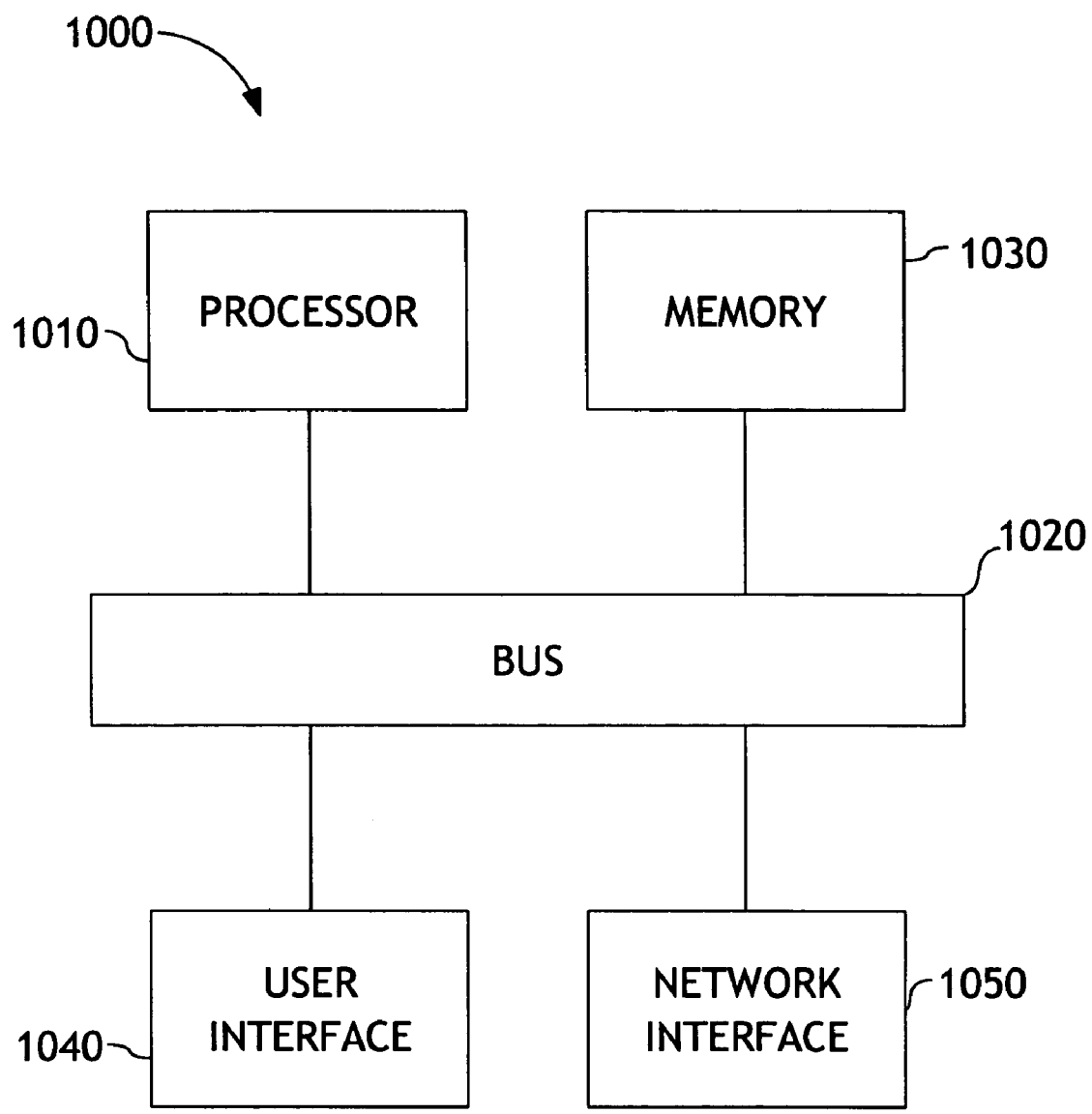
FIG. 10 depicts a block diagram of a computing system in accordance with the present invention.

Referring to FIG. 10, a block diagram of a computing system 1000 in accordance with an embodiment of the present invention is shown. Computing system 1000 may be present within an appliance 600 of FIG. 6 and (700 of FIGS. 7A and 7B) in accordance with the present invention. Further, computing system 1000 may be part of an administration console 820 and remote diagnostics system 830 of FIG. 8. Computing system 1000 may include a processor 1010, a bus 1020, a memory 1030, user interface 1040, and a network interface element 1050. It is contemplated that computing system 1000 may be implemented as a personal computer, server, and the like without departing from the scope and intent of the present invention.

Processor 1010 may include one or more central processing units such as microprocessors or microcontrollers for executing programs stored in memory 1030, performing data manipulations and controlling the tasks of the computing system 1000. Communication with the processor 1010 may be implemented through a message or system bus 1020 for transferring information. Bus 1020 may include a data channel for facilitating information transfer between storage and other peripheral devices of the computing system 1000. Bus 1020 may further provides the set of signals required for communication with the processor 1010, including a data bus, address bus, and control bus. Bus 1020 may comprise any state of the art bus architecture according to promulgated standards, for example industry standard architecture (ISA), extended industry standard architecture (EISA), Micro Channel Architecture (MCA), peripheral device interconnect (PCI) local bus, standards promulgated by the Institute of Electrical and Electronics Engineers (IEEE) including IEEE 488 general-purpose interface bus (GPIB), IEEE 696/S-600, and so on. Furthermore, the system bus 1020 may be compliant with any promulgated industry standard. For example, the system bus 1020 may be designed in compliance with any of the following bus architectures: Industry Standard Architecture (ISA), Extended Industry Standard Architecture (EISA), Micro Channel Architecture, Peripheral Device Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI), as examples.

Memory 1030 may include random access memory (RAM) and may also include read only memory (ROM). Memory 1030 may also include non-volatile random access memory (NVRAM). User interface 1040 may include input elements such as a keyboard, mouse and the like whereby an administrator may enter commands that may be executed by processor 1010.

A network interface element 1050 may provide transfer of data video and the like between the computing system 1000 and remote servers, workstations, storage and the like including network attached storage. The network interface element 1050 may implement industry promulgated architecture standards, including Recommended Standard 232 (RS-232) promulgated by the Electrical Industries Association, Infrared Data Association (IrDA) standards, Ethernet IEEE 802 standards, Fibre Channel, Fibre Channel over Internet Protocol, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and Internet Small Computer System Interface (iSCSI) as examples.

While embodiments of the invention are directed to field replaceable unit status and configuration, it is contemplated that any type of replaceable unit may be utilized in accordance with the present invention without departing from the scope and intent of the present invention. For instance, embodiments of the invention may be incorporated at a manufacturing level in conjunction with testing of appliances prior to delivery.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An appliance, comprising:
    a chassis;
    a contents viewing port integrated within said chassis; and
    at least one card, said card being integrated within said chassis; said card including:
        a housing, said housing including at least one receptacle for securing a replaceable unit;
        a visible alert, said visible alert being mounted in proximity to said at least one receptacle; and
        a supplemental power source mounted to said housing, said supplemental power source providing supplemental power to enable said visible alert, whereby status information is received by said at least one card, said visible alert indicating a status regarding said replaceable unit, said visible alert being visible outside of said appliance through said contents viewing port, said visible alert remaining enabled when said at least one card is removed from said appliance.

2. The appliance as claimed in claim 1, wherein said contents viewing port is a transparent cover.

3. The appliance as claimed in claim 1, wherein said contents viewing port includes a plurality of apertures.

4. The appliance as claimed in claim 1, further comprising a light path assembly, said light path assembly directing light from said visible alert to said contents viewing port.

5. A network system employing status and configuration indication of field replaceable units, comprising:
    at least one appliance, said at least one appliance including
        a housing, said housing including at least one receptacle for securing a replaceable unit;
        a visible alert, said visible alert being mounted in proximity to said at least one receptacle; and
        a supplemental power source, mounted to said housing, said supplemental power source providing supplemental power to enable said visible alert, whereby status information is received by said appliance regarding said replaceable unit, said visible alert being capable of indicating a status regarding said replaceable unit; and
    an administration console, said administration console coupled to said at least one appliance, wherein status information regarding said replaceable unit is sent from said at least one appliance to said administration console.

6. The network system as claimed in claim 5, wherein said visible alert automatically indicates status of said replaceable unit upon receipt of status information by said appliance.

7. The network system as claimed in claim 5, wherein said visible alert is engaged by a system administrator via said administration console.

8. The network system as claimed in claim 5, wherein said administration console is capable of performing tests on said replaceable unit.

9. An appliance, comprising:
    a chassis;
    at least one card, said card being integrated within said chassis; said at least one card being removable from said chassis of said appliance, said at least one card including:
        a housing, said housing including at least one receptacle for securing a replaceable unit;
        a visible alert, said visible alert being mounted in proximity to said at least one receptacle; and
        a supplemental power source mounted to said housing, said supplemental power source providing supplemental power to enable said visible alert, whereby status information is received by said at least one card, said visible alert indicating a status regarding said replaceable unit, said visible alert remaining enabled when said at least one card is removed from said chassis of said appliance and when said replaceable unit is removed from said at least one receptacle.

* * * * *